(12) United States Patent
Leung et al.

(10) Patent No.: US 8,714,731 B2
(45) Date of Patent: May 6, 2014

(54) INKJET INK AND INTERMEDIATE TRANSFER MEDIUM FOR INKJET PRINTING

(75) Inventors: Sui-hing Leung, Cupertino, CA (US); Hou T. Ng, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 13/383,756

(22) PCT Filed: Jul. 31, 2009

(86) PCT No.: PCT/US2009/052406
§ 371 (c)(1),
(2), (4) Date: Mar. 27, 2012

(87) PCT Pub. No.: WO2011/014185
PCT Pub. Date: Feb. 3, 2011

(65) Prior Publication Data
US 2012/0105525 A1   May 3, 2012

(51) Int. Cl.
*B41J 2/01* (2006.01)
*B41J 2/005* (2006.01)
*B41J 13/22* (2006.01)

(52) U.S. Cl.
CPC .............. *B41J 2/0057* (2013.01); *B41J 13/223* (2013.01); *B41J 2002/012* (2013.01)
USPC ....................................................... 347/103

(58) Field of Classification Search
CPC ... B41J 2/0057; B41J 13/223; B41J 2002/012
USPC ........................................ 347/9, 101, 103, 104
See application file for complete search history.

(56) References Cited

U.S. PATENT DOCUMENTS

| 5,099,256 | A | 3/1992 | Anderson |
| 5,160,535 | A | 11/1992 | Cooke et al. |
| 5,188,664 | A | 2/1993 | Adamic et al. |
| 5,600,352 | A | 2/1997 | Knierim et al. |
| 5,841,456 | A | 11/1998 | Takei et al. |
| 6,086,987 | A | 7/2000 | Yamanaka et al. |
| 6,102,538 | A | 8/2000 | Ochi et al. |
| 6,109,746 | A | 8/2000 | Jeanmaire et al. |
| 6,231,652 | B1 | 5/2001 | Koyano et al. |
| 6,357,870 | B1 | 3/2002 | Beach et al. |
| 7,780,286 | B2 * | 8/2010 | Yahiro ........................... 347/103 |
| 7,997,717 | B2 * | 8/2011 | Taniuchi et al. ............... 347/103 |
| 2006/0075915 | A1 | 4/2006 | Sonokawa et al. |
| 2006/0164488 | A1 | 7/2006 | Taniuchi et al. |
| 2007/0195127 | A1 | 8/2007 | Ahn et al. |

FOREIGN PATENT DOCUMENTS

JP    10-217604    8/1998

* cited by examiner

*Primary Examiner* — An Do

(57) ABSTRACT

An inkjet ink and an intermediate transfer medium for inkjet printing are disclosed herein. During inkjet printing, the inkjet ink forms ink drops having a contact angle (θ) of less than or equal to 50° on the intermediate transfer medium, where the contact angle (θ) reduces or substantially eliminates coalescence of adjacent ink drops. The contact angle (θ) may be obtained by controlling a property of the inkjet ink and/or a property of the surface of the intermediate transfer medium.

18 Claims, 5 Drawing Sheets

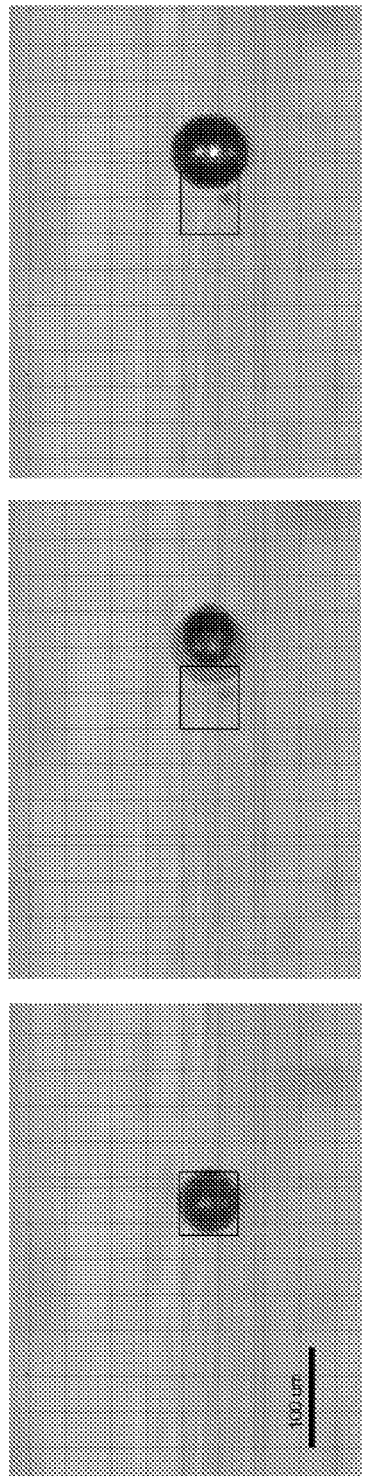
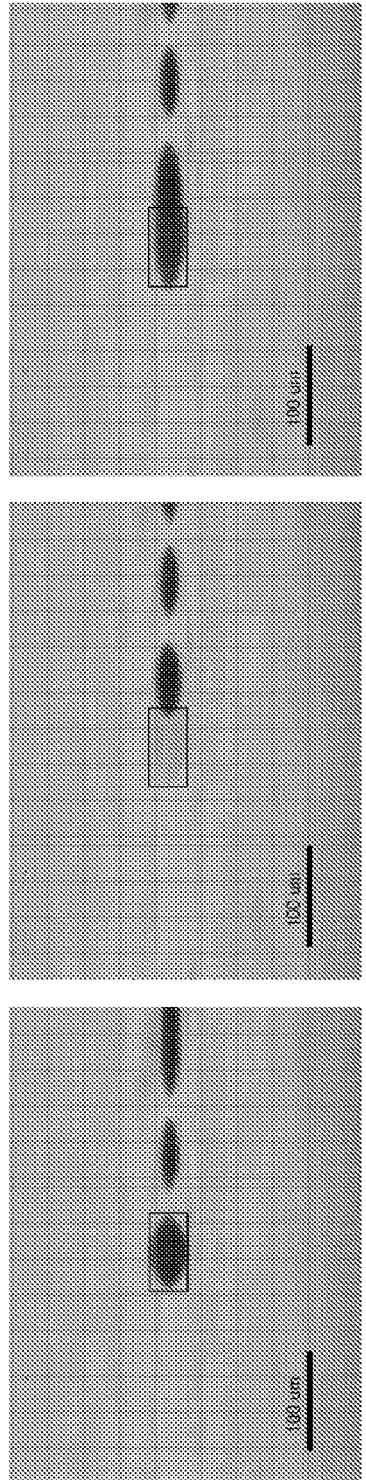
Fig. 7A  Fig. 7B  Fig. 7C
Fig. 8A  Fig. 8B  Fig. 8C
☐ LOCATION OF INCOMING INK DROP

INKJET INK AND INTERMEDIATE TRANSFER MEDIUM FOR INKJET PRINTING

BACKGROUND

The present disclosure relates generally to inkjet inks and intermediate transfer mediums for inkjet printing.

Inkjet printing processes are often used to effectively produce a printed image on a surface of a substrate. Some inkjet printing processes include ejecting a plurality of ink drops onto a non-porous medium (often referred to as an intermediate transfer medium (ITM)), and then transferring the ink drops onto the substrate to form the printed image thereon. In some instances, adjacent ink drops ejected onto the ITM may coalesce and form larger ink drops on the ITM surface.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 7A through 7C are a series of snapshots of two adjacent ink drops ejected onto an intermediate transfer medium, where the ink drops have a contact angle of 90°;

FIGS. 8A through 8C are a series of snapshots of two adjacent ink drops ejected onto an intermediate transfer medium, where the ink drops have a contact angle of 50°.

DETAILED DESCRIPTION

Desirable print quality may be achieved by ejecting ink drops having a desired size (e.g., measured in terms of volume) onto an intermediate transfer medium (ITM), where such ink drops are positioned relatively close (e.g., within about 1 micron to about 10 microns) to each other on the ITM. In some instances, however, the volume and/or the placement of the adjacent ink drops on the ITM may cause such ink drops to coalesce and form larger ink drops. These larger ink drops may deleteriously affect the print quality of an image that is ultimately transferred from the ITM to a substrate. In a non-limiting example, the substrate may be selected from a variety of media including, e.g., plain paper, coated paper, polymeric substrates, etc.

Embodiment(s) of the inkjet ink and the intermediate transfer medium (ITM), as disclosed herein, may advantageously be used in an inkjet printing system to form an image on an ITM, where such image has improved print quality. Without being bound to any theory, it is believed that such improved print quality may be achieved by reducing or substantially eliminating coalescence between adjacent ink drops ejected onto the ITM. It is further believed that the reduced or eliminated coalescence may be achieved by ejecting the ink drops onto the ITM having a desired contact angle $\theta$ (shown in FIG. 3).

As used herein, coalescence of adjacent ink drops is "substantially eliminated" when there is complete elimination of coalescence between the ink drops, as well as when coalescence is close to, but slightly removed from being completely eliminated. In an example, coalescence may be "substantially eliminated" when no coalescence occurs between adjacent ink drops. In another example, coalescence may also be "substantially eliminated" when about 5% or less coalescence occurs between adjacent ink drops. It is to be understood that, in some instances, the term "substantially eliminated" may be used interchangeably with the term "eliminated," especially when no coalescence occurs between the ink drops.

Figure 1:
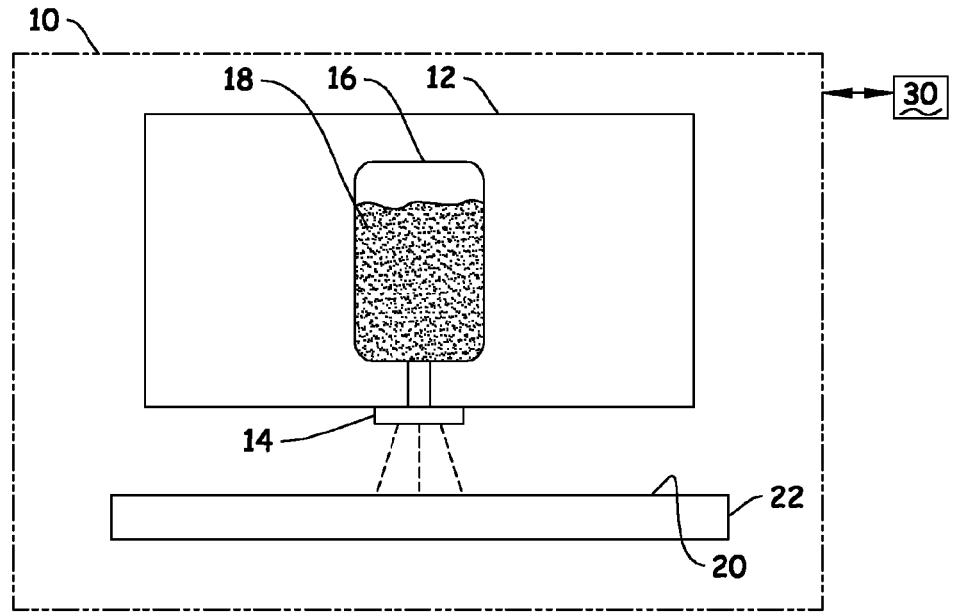
FIG. 1 semi-schematically depicts an embodiment of an inkjet printing system.

An embodiment of an inkjet printing system (identified by reference numeral 10) including the inkjet ink and the intermediate transfer medium is semi-schematically depicted in FIG. 1. The inkjet printing system 10 generally includes an inkjet printing device 12 (such as, e.g., a continuous device, a drop-on-demand device, a thermal inkjet (TIJ) device, or a piezoelectric inkjet device) having an inkjet fluid ejector 14 fluidically coupled to a reservoir 16. In a non-limiting example, the reservoir 14 contains an inkjet ink (identified by reference numeral 18). Examples of the inkjet ink 18 will be described in detail below. The fluid ejector 14 is configured to eject the inkjet ink 18 onto a surface 20 of an intermediate transfer medium (ITM) 22 during inkjet printing.

It is to be understood that the printing device 12 may include more than one fluid ejector 14, where each is fluidically coupled to the reservoir 16 or to at least a second reservoir 16 (the multiple ejectors/reservoirs not being shown in FIG. 1). For example, the inkjet printing system 10 may include an ink set having two or more inkjet inks, a fixer, and/or other composition(s), each of which may be stored in respective reservoirs. The reservoirs may be in fluid communication with a single fluid ejector (such as the ejector 14), may be in fluid communication with two or more other fluid ejectors, or may be in fluid communication with their own respective fluid ejector.

The inkjet printing system 10 further has selectively and operatively associated therewith a processor 30 capable of running one or more software programs or routines. These software programs or routines are generally configured to perform one or more steps of embodiments of a method of reducing or substantially eliminating coalescence between adjacent ink drops described in detail hereinbelow.

In an embodiment, reducing or substantially eliminating coalescence between adjacent ink drops ejected onto the ITM 22 may be accomplished by i) determining the desired contact angle $\theta$ of the ink drops, and ii) controlling a property of the inkjet ink and/or a property of the ITM surface 20 to obtain the desired contact angle $\theta$. As discussed hereinbelow, the coalescence is closely related to the hydrophilicity/hydrophobicity of the ink and the transfer medium 22. As such, in one embodiment, it is desirable that the surface energy of the inkjet ink match/correspond with the surface energy of the ITM 22 in order to obtain the desirable contact angle θ and the reduced level of coalescence.

Figure 2:
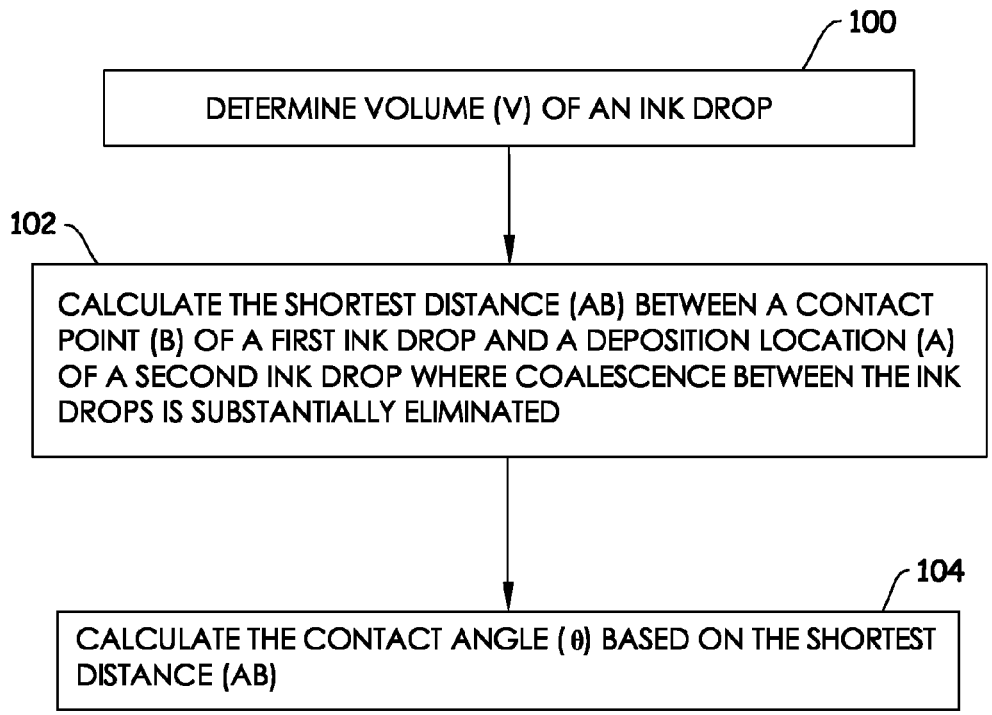
FIG. 2 is a flow diagram depicting an embodiment of a method of determining a desired contact angle ($\theta$) of adjacent ink drops ejected onto an intermediate transfer medium.

An example of a method of determining the desired contact angle θ is shown in FIG. 2. The method generally includes determining a volume V of an ink drop (shown at reference numeral 100 in FIG. 2), calculating the shortest distance AB between a contact point B of a first ink drop and a deposition location A of a second ink drop where coalescence of the ink drops is substantially eliminated (as shown at reference numeral 102 in FIG. 2), and calculating the contact angle θ based on the shortest distance AB (as shown at reference numeral 104 in FIG. 2).

Figure 3:
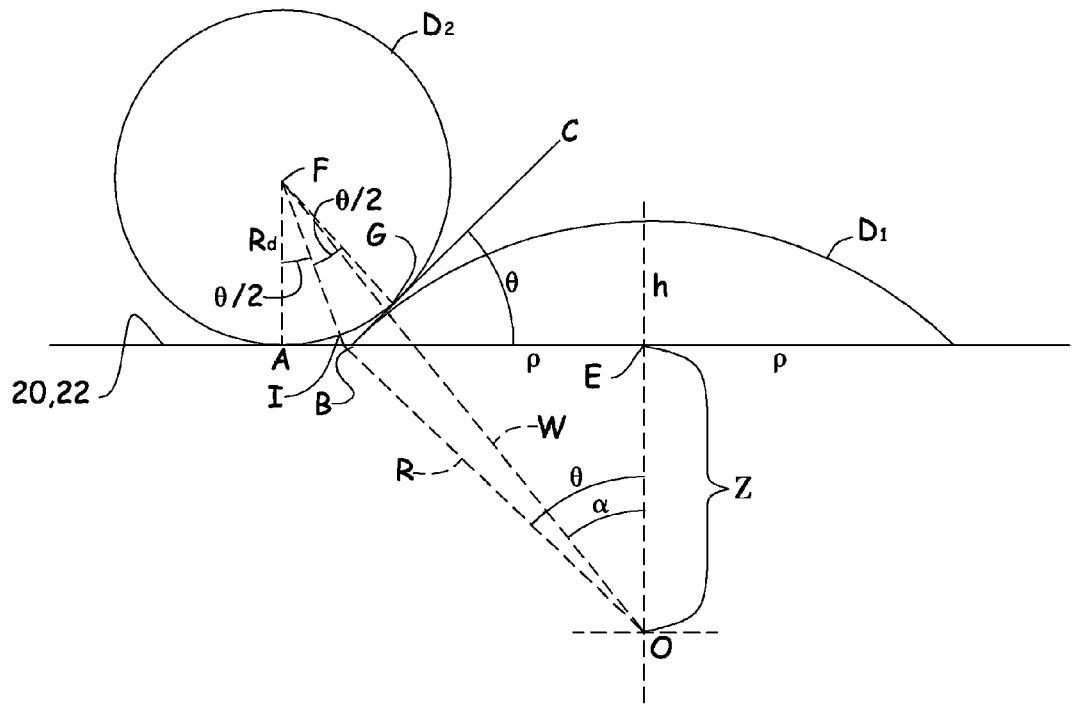
FIG. 3 is an enlarged, schematic depiction of adjacent ink drops ejected onto a surface of an intermediate transfer medium.

FIG. 3 schematically depicts two ink drops $D_1$ and $D_2$ ejected onto the surface 20 of the ITM 22. Without being bound to any theory, it is believed that the ink drops $D_1$, $D_2$ assume a shape, upon contacting the ITM surface 20 during inkjet printing, that substantially minimizes their individual surface energies $\gamma_D$. Assuming that the ink drops $D_1$, $D_2$ are generally spherically shaped, the shape that the drops obtain upon contacting the ITM surface 20 includes that of a spherical cap (such as, e.g., the ink drop $D_1$ as shown in FIG. 3). In plan view, the ink drop $D_1$ shaped as a spherical cap is substantially circular and has a radius ρ. Also during inkjet printing, the other ink drop $D_2$ ejected adjacent to the spherical cap $D_1$ has a radius $R_d$. In an example, the volume V of the ink drop $D_1$ may be determined using Equation (1):

$$V_{D1} = \frac{\pi h(3\rho^2 + h^2)}{6} \quad \text{Equation (1)}$$

where h is the height of the ink drop $D_1$ (measured from the ITM surface 20), and ρ is the radius of the spherical cap $D_1$. The spherical cap $D_1$ may otherwise be determined using Equation (2):

$$V_{D1} = \frac{\pi \rho^3 (2 - 3\cos\theta + \cos^3\theta)}{3\sin^3\theta} \quad \text{Equation (2)}$$

where ρ is the radius of the spherical cap $D_1$, and θ is the contact angle of the ink drop $D_1$ on the ITM 22.

The volume of the ink drop $D_2$ may be determined using Equation (3) below:

$$V_{D2} = \frac{4}{3}\pi R_d^3 \quad \text{Equation (3)}$$

FIG. 3 further shows a contact point B of the ink drop $D_1$ (referred to herein as the "first ink drop") and a deposition location A of the ink drop $D_2$ (referred to herein as the "second ink drop"). The contact point B of the first ink drop $D_1$ generally refers to a point located on the ink drop $D_1$ that the second ink drop $D_2$ may first contact when ejected onto the ITM 22. The contact point B may also be referred to as a point along the radius ρ of the ink drop $D_1$ that is furthest away from its center point E. Further, the deposition location A of the second ink drop $D_2$ refers to a point on the ITM surface 20 that the second ink drop $D_2$ contacts when the ink drop $D_2$ is ejected thereon.

The shortest distance AB is measured between the contact point B and the deposition location A, and may be used herein to determine the positioning of the second ink drop $D_2$ relative to that of the first ink drop $D_1$ so that coalescence is substantially eliminated. It is to be understood that if the second ink drop $D_2$ is ejected too close to the first ink drop $D_1$, the second ink drop $D_2$ may contact the first ink drop $D_1$ prior to contacting the ITM surface 20 and coalescence between the ink drops $D_1$, $D_2$ may then occur. Such coalescence tends to result in a single larger ink drop having twice the volume of an initially ejected ink drop. As stated above, the coalescence between the ink drops $D_1$, $D_2$ may deleteriously affect the print quality of the image transferred to the substrate.

On the other hand, when the second ink drop $D_2$ is positioned no closer than the calculated shortest distance AB (or relatively close thereto, as defined herein), the ink drop $D_2$ may contact the ITM surface 20 prior to contacting the ink drop $D_1$. In such instances, the ink drop $D_2$ pins to the ITM surface 20 and forms a circular mark thereon. It is to be understood that although the ink drops $D_1$ and $D_2$ contact, such contact often results in overlapping (which generally does not deleteriously affect optical density of the resulting image); and not coalescence of the ink drops $D_1$ and $D_2$. The overlapping of the ink drops will be described in further detail below in conjunction with FIGS. 4 and 5.

An example of a method of calculating the shortest distance AB between the contact point B of the first ink drop $D_1$ and the deposition location A of the second ink drop $D_2$ will be described herein in conjunction with FIG. 3.

The method includes drawing a tangent line from the contact point B through a surface point G located at the surface of the ink drop $D_2$. In an example, the tangent line may also extend out to an arbitrary point C (as shown in FIG. 3). This tangent line is referred to herein as tangent line BC. The angle formed between the tangent line BC and the ITM surface 20 (e.g., line BE) is referred to herein as the contact angle θ. Point I along the outer surface of the drop $D_2$ represents an equidistant point between points A and G.

As shown in FIG. 3, the center point of the second ink drop $D_2$ is identified herein by reference character F. The deposition location A of the second ink drop $D_2$ may be determined by drawing a line from the center point F to the ITM surface 20. This line generally begins at the center point F and is perpendicular to the surface 20. The distance of each of lines FA, FI, and FG is equal to the radius $R_d$ of the second ink drop $D_2$. Another line may be drawn from center point F of the second ink drop $D_2$ to point I of the second ink drop $D_2$. The angle formed between the lines FA and FI is half of the contact angle θ. Likewise, the angle formed between the lines FI and a line defined between the center point F and the surface point G is also half of the contact angle θ. In other words, the angle formed between lines FA and FI and between lines FI and FG is θ/2. Accordingly, the shortest distance AB between the contact point B and the deposition location A may be calculated using Equation (4):

$$AB = R_d \tan\left(\frac{\theta}{2}\right) \quad \text{Equation (4)}$$

It is to be understood that the surface of the spherical cap formed by the ink drop $D_1$ when ejected onto the ITM 22 generally curves away from the tangent line BC. As such, the shortest distance AB may, in some cases, be slightly overestimated because of this curvature. In an example, the overestimation error may be determined using Equation (5):

$$\text{Error\_of\_Overestimation} = 1 - \cos\alpha \quad \text{Equation (5)}$$

where $$\cos\alpha = \frac{R_d + R\cos\theta}{R + R_d}$$

where $R_d$ is the radius of the ink drop $D_2$, R is the distance from the contact point B of the ink drop $D_1$ to point O shown in FIG. 3, and θ is the contact angle. As shown in FIG. 3, the distance between point E and point O is represented by Z, which equals R cos θ. It is to be understood that a small contact angle θ has a correspondingly small overestimation error. In a non-limiting example, the overestimation error may be less than about 10% when the contact angle θ is less than about 50°. In another non-limiting example, when θ is 90°, the error is 10.3%.

Figure 4:
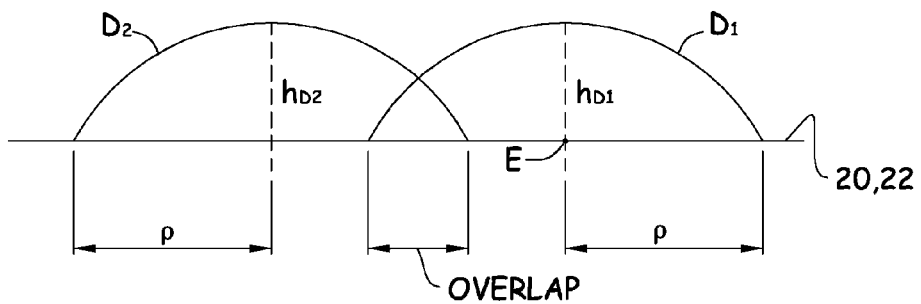
FIG. 4 is an enlarged, schematic depiction of two overlapping ink drops ejected onto an intermediate transfer medium.

Referring now to FIG. 4, a schematic illustration of the ink drops $D_1$ and $D_2$ after the ink drop $D_2$ contacts the ITM surface 20 and forms a spherical cap is depicted. As shown, when both drops $D_1$, $D_2$ become spherical caps, there is a region on the surface 20 where the caps overlap (denoted by "overlap" in the Figure).

Figure 5:
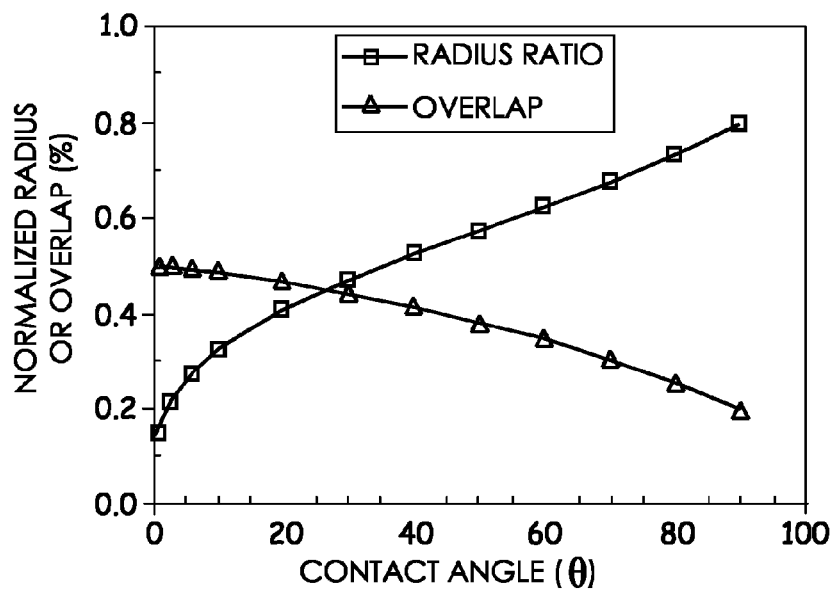
FIG. 5 is a graph showing the normalized radius or overlap (measured in terms of percentage (%)) of adjacent ink drops versus the contact angle ($\theta$) of the ink drops ejected onto an intermediate transfer medium.

As shown in FIG. 5, the contact angle is influenced by both the extent of overlap between the drops $D_1$, $D_2$ and the radius ratio of the drops $D_1$, $D_2$. In an embodiment, the desired contact angle θ may be determined using the normalized overlap or normalized radius ratio (both of which are measured in terms of percentage (%) as depicted in FIG. 5). The normalized overlap may be determined according to Equation (6):

$$\text{overlap}(\%) = 1/2 - \left(\frac{2 - 3\cos\theta + \cos^3\theta}{4(1 + \cos\theta)^3}\right)^{1/3} \quad \text{Equation (6)}$$

$$= 1/2\left(1 - \frac{R_d \tan(\theta/2)}{\rho}\right)$$

where ρ is the radius of the ink drop $D_1$, $R_d$ is the radius of the ink drop $D_2$, and θ is the contact angle. As shown in FIG. 5, the overlap of the ink drops $D_1$, $D_2$ generally decreases with an increasing contact angle θ. In an example, when the contact angle is 1°, the radius ratio is about 0.15 (e.g., 0.148) and the overlap is about 50% (e.g., 0.499), and when the contact angle is 90°, the radius ratio is about 0.8 (e.g., 0.794) and the overlap is about 20% (e.g., 0.196). The data corresponding with the points shown in FIG. 5 are illustrated in the Table below.

| Contact Angle (degrees) | $R_d/\rho$ | Overlap |
|---|---|---|
| 1 | 0.148 | 0.499 |
| 3 | 0.214 | 0.497 |
| 6 | 0.270 | 0.493 |
| 10 | 0.320 | 0.486 |
| 20 | 0.406 | 0.465 |
| 30 | 0.469 | 0.441 |
| 40 | 0.522 | 0.413 |
| 50 | 0.572 | 0.381 |
| 60 | 0.622 | 0.345 |
| 70 | 0.673 | 0.303 |
| 80 | 0.730 | 0.254 |
| 90 | 0.794 | 0.196 |
| 98 | 0.853 | 0.139 |

It is believed that coalescence of adjacent ink drops may be substantially eliminated when the contact angle θ is as low as possible (and thus overlap may be greater). When the contact angle θ is too high (such as, e.g., above 60°) and overlap is decreased, the transfer of the printed image onto a paper substrate may, in some instances, present a challenge. In a non-limiting example, the highest percentage of overlap that may be used and still provide suitable print quality is about 80%. However, it is to be understood that the desirable percentage of overlap between two adjacent drops may depend upon the level of ink coverage and the image to be produced. For example, when low ink coverage is used, little or no overlap between the drops may be desirable in order to obtain a desirable optical density of the image. As such, depending upon the desirable results, the overlap may range from 0% (i.e., no overlap) up to 80%. Accordingly, the overlap between the ink drops $D_1$ and $D_2$ may be balanced with the contact angle θ in order to achieve the reduced or substantially eliminated coalescence between the ink drops without deleteriously affecting print quality (e.g., optical density) of the printed image.

The contact angle may otherwise be determined using the drop radius-to-cap radius ratio ($R_d/\rho$) curve shown FIG. 5. The normalized radius ratio may be determined according to Equation (7):

$$\frac{R_d}{\rho} = \frac{\left(\frac{2 - 3\cos\theta + \cos^3\theta}{4\sin^3\theta}\right)^{1/3}}{\tan\left(\frac{\theta}{2}\right)} \quad \text{Equation (7)}$$

where $R_d/\rho$ is the radius ratio, and θ is the contact angle. Using the curve shown in FIG. 5, at contact angles of 70° or higher, the radius $R_d$ of the second ink drop $D_2$ is more than about 70% of the radius p of the spherical cap $D_1$. Accordingly, for the same radius p of the ink drop $D_1$, an ink drop (e.g., the ink drop $D_2$) having a high contact angle θ (e.g., greater than 70°) may have more physical clearance from the spherical cap $D_1$. On the other hand, an ink drop having a lower contact angle θ(e.g., less than 70°) will result in a smaller drop radius-to-cap radius ratio and will stay a greater distance from the spherical cap $D_1$ and, thus, have less overlap. Thus, ink drops $D_2$ having the lower contact angle will be more likely to overlap with the spherical cap $D_1$.

Figure 6A:
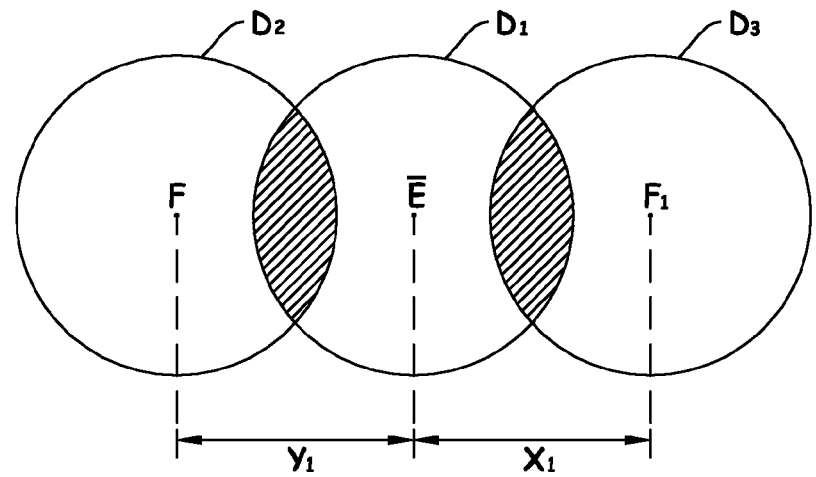
FIGS. 6A and 6B illustrate a top view of three ink drops, wherein in one embodiment, two of the drops have nominal placement with respect to a center drop (FIG. 6A), and in another embodiment, one of the drops has minimum overlap with the center drop and another of the drops has maximum overlap with the center drop.
Figure 6B:
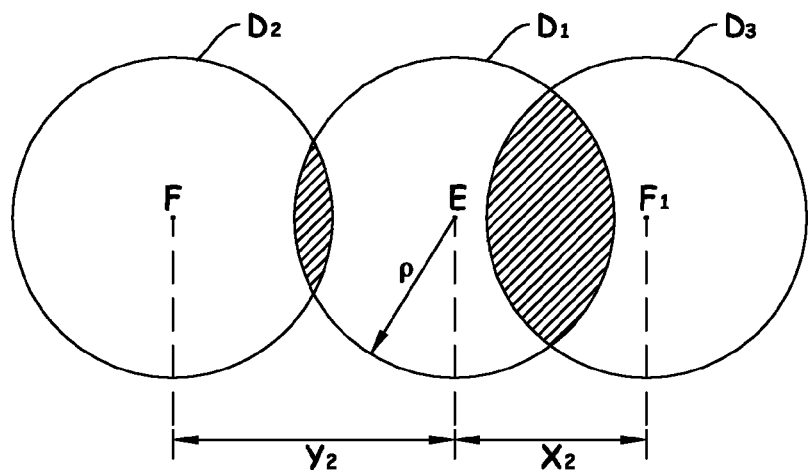

In an embodiment in which three drops are printed adjacent to each other, the overlapping of the adjacent spherical caps above or below a predetermined range (i.e., minimum overlap to maximum overlap), may result in undesirable coalescence. FIG. 6A illustrates the desirable nominal overlap (illustrated by the shaded areas) between adjacent drops $D_1$, $D_2$ and $D_1$, $D_3$. FIG. 6B illustrates the desirable maximum overlap between adjacent drops (see the shaded area between drops $D_1$ and $D_3$) and the desirable minimum overlap between adjacent drops (see the shaded area between drops $D_1$ and $D_2$). When three drops are printed adjacent to each other, the range from the maximum overlap to minimum overlap provides the tolerance for the placement of the ink drops $D_1$, $D_2$, $D_3$ on the ITM 22. As such, it may be desirable to calculate this range. The maximum overlap may be calculated using Equation 8, and the minimum overlap may be calculated using Equation 9.

$$m_x = 1 - \frac{x_2}{2\rho} \qquad \text{Equation (8)}$$

$$m_y = 1 - \frac{y_2}{2\rho} \qquad \text{Equation (9)}$$

Furthermore, $EF=EF_1$ (i.e., $y_1=x_1$) and thus:

$$2 - (m_y + m_x) = \frac{x_2 + y_2}{2\rho} \qquad \text{Equation (10)}$$

In light of the disclosure provided above, the inventors have advantageously found that a desired contact angle θ of less than or equal to 50° reduces or substantially eliminates coalescence of adjacent ink drops ejected onto the ITM 22. In another embodiment, the desired contact angle θ ranges from about 35° to about 55°.

The sequence of snapshots shown in the FIG. 7 series illustrates coalescence of adjacent ink drops ejected onto an ITM during inkjet printing, where the contact angle (θ) of the ink drops was higher (i.e., about 90°) than the desired contact angle disclosed herein. The ITM used for receiving the ink drops was selected from an elastomeric low surface energy material. In this example, carbon loaded polydimethylsiloxane (PDMS) was used, but other suitable media include fluoroelastomers, fluorosilicon elastomers, or the like. The ink drops depicted in the snapshots shown in the FIG. 7 series were ejected onto the ITM using a thermal inkjet pen/ejector at a constant rate of 100 μsec between ejection of each ink drop. The ITM was moving orthogonal to the direction of the motion of the ink, which was ejected from the inkjet pen at room temperature (e.g., about 23° C.). The snapshots were taken using a microscope camera as the ink drops were ejected onto the ITM.

FIG. 7A shows the location of a first ink drop (e.g., $D_1$) on the ITM 22, which was continuously moving to the right-hand-side (as depicted) during inkjet printing. FIG. 7B shows ejection of a second ink drop (e.g., $D_2$) next to the first ink drop $D_1$. FIG. 7C shows coalescence of the first and second ink drops resulting in a single larger ink drop.

The sequence of snapshots shown in the FIG. 8 series, on the other hand, illustrates how coalescence of adjacent ink drops is substantially eliminated when the ink drops have a desired contact angle θ (in this example, about 50°). The ink drops were ejected onto the ITM under the same conditions and using the same procedure as described above for the snapshots shown in the FIG. 7 series. As shown in the FIG. 8 series, the first and second ink drops each have their own footprint on the ITM because the second ink drop pins to the ITM surface 20 before touching the first ink drop.

In an embodiment, the desired contact angle θ may be obtained by controlling the surface energy γ of the inkjet ink and/or of the ITM surface 20. It is to be understood that the desired contact angle θ of the ink drop $D_1$, $D_2$ on the ITM 22 is based, at least in part, on the surface energies $\gamma_{D1}$, $\gamma_{D2}$ of the ink drops $D_1$, $D_2$, respectively, and the surface energy $\gamma_{ITM}$ of ITM surface 20. The relationship between the contact angle θ and the surface energies $\gamma_{D1}$, $\gamma_{D2}$ of the ink drops $D_1$, $D_2$ and the surface energy of the ITM 22 $\gamma_{ITM}$ is shown by Equation (11) (also known as Young's Equation):

$$\gamma_{ITM} = \gamma_D \cdot \cos\theta + \gamma_{Interface} \qquad \text{Equation (11)}$$

where, $\gamma_{ITM}$ is the surface energy of the ITM 22, $\gamma_D$ is the surface energy of one of the ink drops $D_1$, $D_2$, $\gamma_{Interface}$ is the surface free energy at the interface formed between the ink drop and the ITM 22, and θ is the contact angle.

In an embodiment, the surface energy $\gamma_D$ of the inkjet ink may be controlled by including a certain combination of selected components into the inkjet ink formulation, where the presence of such components would render wetting properties of the inkjet ink as substantially less favorable for coalescence with adjacent ink drops. Examples of such components included in the inkjet ink formulation include a certain combination of specific additives and co-solvents.

In a non-limiting example, the inkjet ink includes one or more colorants dispersed in an ink vehicle. As used herein, the term "colorant" refers to a pigment, a dye, or combinations thereof. Suitable pigments include self-dispersed pigments, non-self-dispersed pigments, and polymer-encapsulated pigments. Self-dispersed pigments include those that have been chemically modified at the surface with a charge or a polymeric grouping. This chemical modification aids the pigment in becoming and/or substantially remaining dispersed in a liquid. As a non-limiting example, the pigment selected for the ink may be a self-dispersible anionic pigment. Such pigments are made self-dispersable by the incorporation of carboxylate and/or sulfonate functionalities. The anionic pigments may be associated with $Na^+$, $Li^+$, and $NH_4^+$ cations, although other suitable counter-ions may be used herein. Some non-limiting examples of self-dispersed pigments include anionic pigments selected from sulfonated copper phthalocyanine (CuPc), carboxylated CuPc, carboxylated carbon black pigments, and cationic amine-functionalized pigments.

A non-self-dispersed pigment utilizes a separate and unattached dispersing agent (e.g., polymers, oligomers, surfactants, etc.) in the ink vehicle or physically coated on the surface of the pigment. The presence of such dispersing agents generally prevents the pigment from settling out of the ink vehicle. Non-limiting examples of suitable dispersing agents include anionic surfactants (such as, e.g., sodium dodecyl sulfate (SDS), sodium dioctyl sulfosuccinate (AOT), sodium laureth ether sulfate (SLES), alkyl benzene sulfonates, perfluorosctonoate (PFO), and fatty acid salts), cationic surfactants (such as, e.g., cetyltrimethylammonium bromide (CTAB), cetylpyridinium (CPC), benzalkonium chloride (BAC), and benzethonium chloride (BZT)), or a combination of ionic and non-ionic surfactants (such as, e.g., alkyl poly(ethylene oxide), alkylphenol poly(ethylene oxide), poloxamers, alkyl polyglucosides, and fatty alcohols). Another suitable dispersing agent includes cationic surfactants such as, e.g., polyethoxylated tallow amine (POEA).

Some non-limiting examples of suitable pigments for the ink include pigment cyan (PB) 15:3, pigment cyan (PB) 15:4, pigment magenta (PR) 122, pigment yellow (PY) 155, PY 74, pigment red (PR) 168, pigment green (PG) 36, pigment violet (PV) 23, carbon black (black), white pigment ($TiO_2$), silica, inorganic pigments, and polymer-encapsulated pigments.

Examples of other suitable black pigments include Raven 7000, Raven 5750, Raven 5250, Raven 5000, and Raven 3500 (all of which are commercially available carbon black pigments from Columbian Chemicals, Co. located in Marietta, Ga.). Other examples of suitable black pigments include Color Black FW 200, Color Black FW 2, Color Black FW 2V, Color Black FW 1, Color Black FW 18, Color Black S160, Color Black S170, Special Black 6, Special Black 5, Special Black 4A, Special Black 4 (all of which are commercially available from Degussa Corp. located in Parsippany, N.J.), and self-dispersed black pigments such as Cabo-Jet® 200 and Cabo-Jet® 300, manufactured by Cabot Corporation, located in Bellrica, Mass.

Examples of suitable classes of colored pigments include, but are not limited to anthraquinones, phthalocyanine blues, phthalocyanine greens, diazos, monoazos, pyranthrones, perylenes, heterocyclic yellows, quinacridones, and (thio) indigoids. Non-limiting examples of phthalocyanine blues include copper phthalocyanine blue and derivatives thereof (e.g., PB15). Examples of quinacridones include, but are not limited to pigment orange (PO) 48, PO49, PR122, PR192, PR202, PR206, PR207, PR209, pigment violet (PV) 19, PV42, or combinations thereof. Non-limiting examples of anthraquinones include PR43, PR194 (perinone red), PR216 (brominated pyrathrone red), PR226 (pyranthrone red), or combinations thereof. Perylene pigment examples include, but are not limited to PR123 (vermillion), PR149 (scarlet), PR179 (maroon), PR190 (red), PR189 (yellow shade red), PR224, or combinations thereof. Non-limiting examples of thioindigoids include PR86, PR87, PR88, PR181, PR198, PV36, PV38, or combinations thereof. Examples of suitable heterocyclic yellow pigments include, but are not limited to PY117, PY138, or combinations thereof. Examples of other suitable colored pigments are described in Colour Index, 3rd edition (The Society of Dyers and Colourists, 1982).

In a non-limiting example, the pigment includes particles having a particle size (in terms of diameter) ranging from about 10 nm to about 500 nm. In another non-limiting example, the pigment is present in the inkjet ink in an amount ranging from about 0.5 wt % to about 10 wt % of the inkjet ink. In yet another non-limiting example, the pigment is present in the inkjet ink in an amount ranging from about 2 wt % to about 6 wt % of the inkjet ink. In instances where a dispersing agent is used, in a non-limiting example, the dispersing agent is present in the inkjet ink in an amount ranging from about 0.5 wt % to about 15 wt % of the inkjet ink. In another non-limiting example, the dispersing agent is present in an amount ranging from about 3 wt % to about 5 wt % of the inkjet ink.

Some non-limiting examples of suitable dyes include yellow dyes (such as, e.g., AY-17, DY-132, DY-11, DY-12, Y-104, and/or combinations thereof), magenta dyes (such as, e.g., acid red 52, acid rhodamine B, reactive red 180, acid red 289, acid red 249, M-377, and/or combinations thereof), cyan dyes (such as, e.g., AB-9, DB-199, and/or combinations thereof), and black dyes (such as, e.g., water soluble metal complex azo dyes such as Reactive Black 31 and Reactive Black 8, water soluble polyazo dyes such as Direct Black 19, Direct Black 195, and Direct Black 168, water soluble sulfur dyes such as Solubilized Sulfur Black 1, materials such as carbon black or derivatives of carbon black, graphite, graphite oxide, and pRB31). In a non-limiting example, the amount of dye present in the inkjet ink ranges from about 0.5 wt % to about 3 wt % of the inkjet ink composition.

It is to be understood that, in instances where a combination of a dye and a pigment is used in the inkjet ink, the amount of each present in the ink differs. In a non-limiting example, the inkjet ink may include, for example, a total pigment and dye amount ranging from about 0.5 wt % to about 4 wt %, where the pigment is present in a greater amount than the dye.

As used herein, the term "ink vehicle" refers to the combination of one or more solvents to form a vehicle in which the colorant(s) is/are placed to form the ink composition. In some instances, the ink vehicle includes water in combination with one or more other solvents. Such ink vehicles are referred to herein as aqueous ink vehicles. In an embodiment, the ink vehicle includes organic co-solvents or humectants, wetting agents or surfactants, a biocide, and water.

The organic co-solvents or humectants are used in the inkjet ink to control evaporation or drying of the ink. In an embodiment, the organic co-solvents are dipolar aprotic solvents selected from 2-pyrrolidone and N-methyl-2-pyrrolidone, diols (such as, e.g., 1,2-hexanediol), polyols (such as, e.g., sorbitol, xylitol, and propylene glycol), glyceryl triacetate, glycerine, and combinations thereof. In a non-limiting example, the amount of organic co-solvents are present in the inkjet ink in an amount ranging from about 0.5 wt % to about 15 wt % of the inkjet ink. In another non-limiting example, the organic co-solvents are present in the inkjet ink in an amount ranging from about 8 wt % to about 15 wt % of the inkjet ink. Furthermore, in an example, any of the listed organic co-solvents may be included as a humectant, and when used as such, the amount present in the inkjet ink ranges from about 0.5 wt % to about 30 wt %.

The wetting agent(s) or surfactant(s) are included in the inkjet ink to assist in controlling the physical properties of the ink, such as jetting stability, waterproofness and bleeding. One or more wetting agents or surfactants may be used in the formulation of the inkjet ink. In a non-limiting example, the amount of the wetting agent(s) or surfactant(s) used in the inkjet ink ranges from about 1 wt % to about 20 wt % of the inkjet ink. In another non-limiting example, the amount of the wetting agent(s) or surfactant(s) used ranges from about 3 wt % to about 5 wt % of the inkjet ink.

The wetting agent(s) or surfactant(s) used in the inkjet ink may be nonionic or anionic, and are generally water-soluble organic ethers or alcohols. Several commercially available nonionic surfactants may suitably be used in the formulation of the ink, examples of which include ethoxylated alcohols such as those from the Tergitol® series (e.g., Tergitol® 15S5, Tergitol® 15S7), manufactured by Union Carbide, located in Houston, Tex.; surfactants from the Surfynol® series (e.g. Surfynol® 440 and Surfynol® 465), manufactured by Air Products and Chemicals, Inc., located in Allentown, Pa.; fluorinated surfactants, such as those from the Zonyl® family (e.g., Zonyl® FSO and Zonyl® FSN surfactants), manufactured by E.I. duPont de Nemours Company, located in Wilmington, Del.; fluorinated PolyFox® nonionic surfactants (e.g., PG-154 nonionic surfactants), manufactured by Omnova, located in Fairlawn, Ohio; 2-diglycol surfactants, such as 1,2 hexanediol or 1,2-octanediol; or combinations thereof.

Suitable anionic surfactants that may be used in the ink composition include surfactants of the Dowfax® family (e.g., Dowfax® 8390), manufactured by Dow Chemical Company, located in Midland, Mich., anionic Zonyl® surfactants (e.g., Zonyl® FSA), manufactured by E.I. duPont de Nemours Company; or combinations thereof, sodium laureth ether sulfate (SLES), or sodium dodecyl sulfate (SDS).

The inkjet ink formulation may further include a biocide to inhibit possible microbial growth within the inkjet ink. Some non-limiting examples of the biocide include Proxel™ biocides (manufactured by Arch Chemicals, Inc., Norwalk, Conn.), Troysan® biocides (manufactured by Troy Corporation, Florham Park, N.J.), Biochek™ biocides (manufactured by Etosha Pan, New Delhi, India), Nipacide biocides (manufactured by Clariant UK, Ltd, United Kingdom), Ucarcide (manufactured by the Dow Chemical Company, Midland, Mich.), Preventol (manufactured by Bayer AG, Leverbusen, Germany), Dowicil (manufactured by the Dow Chemical Company), and Tolcide® biocides (manufactured by Rhodia, Courbevoie, France). In a non-limiting example, the biocide may be present in the inkjet ink in an amount up to about 1 wt % of the inkjet ink. In another non-limiting example, the amount of biocide is present in an amount ranging from about 0.05 wt % to about 1 wt %.

The specific additives that may be included in the inkjet ink formulation to achieve the desired surface energy ($\gamma_D$) of the ink include i) a hydantoin glycol, ii) a hyperbranched glycol, iii) a fluorosurfactant, and iv) an organic phosphate. The foregoing additives may be used in the inkjet ink formulation alone or in various combinations.

The hydantoin glycol may be selected from any suitable hydantoin glycols having a hydroxyl value ranging from about 450 to about 550. Non-limiting examples of hydantoin glycols include di-(2-hydroxyethyl)-5,5-dimethylhydantoin, hydantoin-5-acetic acid, Allantoin (i.e., 5-ureidohydantoin), L-Aspartic acid hydantoin, and combinations thereof. In a non-limiting example, the hydantoin glycol is present in the inkjet ink in an amount ranging from about 1 wt % to about 15 wt % of the inkjet ink.

The hyperbranched glycol may be selected from ethyl glycol, diethylene glycol, ethylene glycol butyl ether, ethylene glycol-bis(2-aminoethylether)-N,N,N',N'-tetraacetic acid, poly(ethylene glycol)-block-poly(propylene glycol)-block-poly(ethylene glycol) (such as, e.g., Synperonic® F108, manufactured by Unichema Chemie BV, Netherlands), and combinations thereof. In a non-limiting example, the amount of the hyperbranched glycol present in the inkjet ink ranges from about 0.5 wt % to about 10 wt % of the inkjet ink. In another non-limiting example, the hyperbranched glycol is present in an amount ranging from about 0.5 wt % to about 5 wt %.

The fluorosurfactant may be selected from surfactants of the Zonyl® family (e.g., Zonyl® FSO surfactants), manufactured by E.I. duPont de Nemours Company, Wilmington, Del.; PolyFox® surfactants (e.g., PolyFox® AT), manufactured by Omnova, located in Fairlawn, Ohio; Masurf® surfactants (e.g., Masurf® FS) manufactured by Mason Chemical Company, Arlington Heights, Ill.; and fluorosurfactants manufactured by Advanced Polymer, Inc, Carkstadt, N.J. (e.g., APFS-14, APFS-17, and APFS-24). One or more of the foregoing examples of the fluorosurfactant may be used alone in the inkjet ink formulation or in combination with one or more of the other surfactants that may be present in the inkjet ink as recited above. In a non-limiting example, the fluorosurfactant is present in the inkjet ink in an amount ranging from about 0.01 wt % to about 2 wt % of the inkjet ink. In another non-limiting example, the fluorosurfactant is present in an amount ranging from about 0.01 wt % to about 1 wt % of the inkjet ink.

The organic phosphate may be selected from oleth-3 phosphate, PPG-5 ceteth-10 phosphate, linoleamidopropyl PG-dimonium chloride phosphate, trideceth-5 phosphate, oleth-5 phosphate, and combinations thereof. In a non-limiting example, the amount of the organic phosphate present in the inkjet ink ranges from about 0.2 wt % to about 2 wt % of the inkjet ink.

As stated above, the inkjet ink further includes water. Generally, the amount of water is present in the inkjet ink in an amount ranging from about 40 wt % to about 90 wt % of the inkjet ink. In another example, the amount of water is present in the inkjet ink in an amount ranging from about 60 wt % to about 80 wt % of the inkjet ink. The amount of water may be increased or decreased as desired.

As previously mentioned, achieving the desirable contact angle θ may be obtained by controlling the surface energy $\gamma_D$ of the inkjet ink and/or the surface energy $\gamma_{ITM}$ of the ITM surface 20. This may be accomplished by i) decreasing the surface energy $\gamma_D$ of the inkjet ink, ii) increasing the surface energy $\gamma_{ITM}$ of the ITM surface 20, or iii) combinations thereof (such as, e.g., a combination of decreasing the surface energy $\gamma_D$ of the inkjet ink and increasing the surface energy $\gamma_{ITM}$ of the ITM surface 20). It is to be understood that one or more of the surface energies $\gamma_D$, $\gamma_{ITM}$ may be adjusted as reasonable in order to achieve the desired contact angle θ.

The surface energy $\gamma_D$ of the inkjet ink may be decreased by adjusting the amount of one or more components present in the inkjet ink. In a non-limiting example, the amount of the hydantoin glycol, the hyperbranched glycol, and/or the fluorosurfactant present in the inkjet ink may be adjusted. It is to be understood that the adjusting of the amount of one or more of the above-listed components of the inkjet ink is based, at least in part, on the surface energy $\gamma_{ITM}$ of the ITM surface 20. For instance, if the surface energy $\gamma_{ITM}$ of the ITM surface 20 is considered to be low (such as, e.g., 226 mJm$^{-2}$), the amount of the above-listed components of the inkjet ink may be adjusted to reduce the surface energy $\gamma_D$ of the inkjet ink until the surface energy of the ink matched/substantially matched the surface energy of the ITM 22, and the desired contact angle θ is obtained.

In an example using the low surface energy ITM, the surface energy $\gamma_D$ of the inkjet ink may be decreased by increasing the amount of the fluorosurfactant in the inkjet ink formulation. For instance, the fluorosurfactant may be increased in an amount ranging from about 0.05 wt % to about 15 wt % higher than the original amount in order to achieve the desired surface energy $\gamma_D$. In other instances, the fluorosurfactant may be increased in an amount ranging from about 0.1 wt % to about 5 wt % higher than the original amount to achieve the desired surface energy γD. Assuming that the original inkjet ink includes, e.g., about 5 wt % to about 12 wt % of the hydantoin glycol, about 0.5 wt % to about 2 wt % of the organic solvent, about 1 wt % to about 5 wt % of the hyperbranched glycol, and about 0.05 wt % to about 0.15 wt % of the fluorosurfactant, in order to achieve a contact angle θ of about 45°, the fluorosurfactant amount may be increased, e.g., by about 0.5 wt % to about 2 wt %, while maintaining the amounts of the other components in the ink. It is believed that when a low surface energy ITM 22 is used, the presence of the fluorosurfactant increases the interaction of the ink (specifically the co-solvents and the colorant (i.e., the pigment and/or the dye) of the ink) with the ITM surface 20, thereby reducing the contact angle.

The surface energy $\gamma_D$ of the inkjet ink may otherwise be increased by removing at least one of the hydantoin glycol or the hyperbranched glycol. It is to be understood that one or more of the foregoing elements may be removed from the inkjet ink formulation as necessary in order to adjust or tweak the surface energy $\gamma_D$ to match that of the ITM 22 selected.

In some cases, the surface energy $\gamma_D$ of the inkjet ink may be decreased by actually replacing one or more of the organic solvents, the hydantoin glycol, or the hyperbranched glycol with at least one other element that is more hydrophobic than the component being replaced. When selecting a more hydrophobic component to include in the ink composition in place of a solvent, hydantoin glycol, or hyperbranched glycol, it is to be understood that the selected component should promote interaction with the ITM 22. Furthermore, the component replacing the solvent, hydantoin glycol, or hyperbranched glycol may interact with water molecules present in the inkjet ink. Such interaction often affects the surface energy of the ink. It is to be understood that the interaction with the water molecules and the replacement component(s) is at least the same level of interaction as that of the component that the replacement component(s) is/are replacing. For example, by including a longer aliphatic chain and maintaining any active functional group (e.g., hydroxyl groups, carboxyl groups, etc.) on the backbone of the replacement component, increased interaction with the ITM 22 may be achieved while maintaining such component's interaction level with water molecules in the ink. In an example, one of the co-solvents present in the inkjet ink may be replaced with one or more other solvents that are more hydrophobic than the original one co-solvent. In a non-limiting example, the original co-solvent is a hyperbranched glycol having X number of carbons in one of the branched chains, and the replacement solvent is the same hyperbranched glycol except the branched chain with X carbons is replaced with a longer aliphatic hydrocarbon chain (i.e., more carbons than X).

It is possible that the components replacing one or more of the co-solvent, hydantoin glycol, or the hyperbranched glycol may be used in substantially the same loading as the replaced element. However, the amount of the replacement component depends, at least in part, on the desired contact angle θ and, in most instances, the loading of the replacement component(s) is significantly different from the loading of the component(s) being replaced.

In instances where the ITM surface 20 is hydrophobic, the surface energy ($\gamma_{ITM}$ may, in some instances, be too low (such as, e.g., less than about 200 mJm$^{-2}$), presenting difficulties in achieving the desired contact angle θ in cases where the amount or formulation of the inkjet ink is not adjusted or changed. The surface energy $\gamma_{ITM}$ of the ITM surface 20 may therefore be increased, for example, by making the ITM surface 20 less hydrophobic. In an example, the surface energy $\gamma_{ITM}$ of the ITM surface 20 may be increased by subjecting the surface 20 to a plasma (such as, e.g., oxygen or a mixed gas) to introduce, e.g., hydroxyl groups to the ITM surface 20. The presence of such hydroxyl groups advantageously increases the surface energy $\gamma_{ITM}$ of the ITM surface 20 so that the desired contact angle θ may be obtained.

Figure 9:
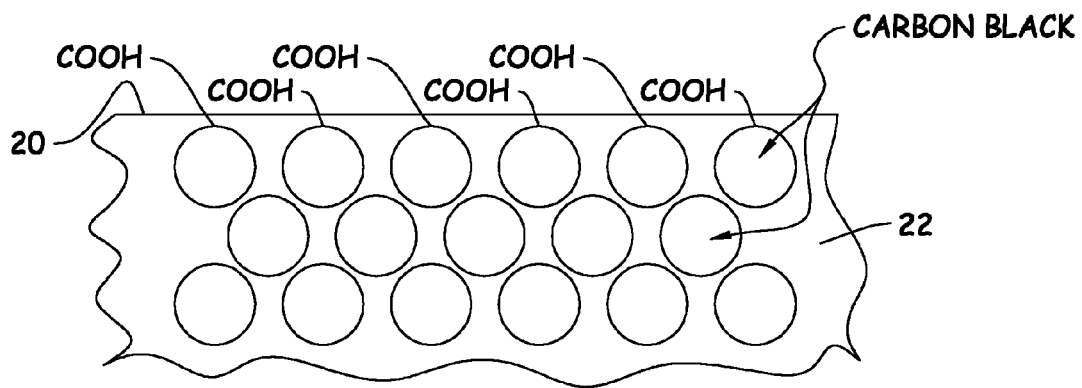
FIG. 9 is an enlarged, schematic depiction of an intermediate transfer medium including functionalized particles introduced into the matrix of the intermediate transfer medium.

The surface energy $\gamma_{ITM}$ of the ITM surface 20 may otherwise be increased, for example, by incorporating particles into the ITM 22 matrix, where such particles are covalently bonded to at least one terminating group. In an example, the amount of the particles incorporated into the ITM 22 matrix is sufficient to obtain the desired contact angle θ and depends, at least in part, on the surface energy $\gamma\gamma_D$ of the inkjet ink. Non-limiting examples of terminating groups that may be covalently bonded to the particles include at least one carboxylic terminating group, at least one hydroxyl terminating group, at least one sulfonate group, or combinations thereof. For instance, as shown in FIG. 9, nanoparticles of carbon black having carboxylic terminating group(s) may be incorporated into the ITM 22 matrix in an amount sufficient to obtain the desired contact angle θ. In a non-limiting example, the amount of the nanoparticles incorporated into the ITM 22 matrix ranges from about 5 wt % to about 20 wt %. The particles may be incorporated into the ITM 22 matrix during manufacturing thereof, but prior to curing and hardening. In an example, the particles (e.g., carbon black) are incorporated into the ITM 22 matrix by spraying a substantially uniform layer of the particles on the ITM surface 20 and subjecting the sprayed surface 20 to an imprinting process. In another example, the particles are incorporated into the ITM 22 matrix by applying a layer including a mixture of carbon loaded materials for the ITM 22 matrix onto the ITM surface 20 using, e.g., a doctor blade, followed by a curing process. After curing, the carbon loaded layer may be laminated, thereby forming a thin film on the ITM surface 20.

It is to be understood that other means of obtaining the desired contact angle θ are also contemplated herein. For instance, the desired contact angle θ may be obtained by controlling the evaporation of the water from the ink drops. Such may be accomplished, for example, by reducing the amount of humectants present in the inkjet ink. Without being bound to any theory, it is believed that when the evaporation of the water from the ink drops is increased, the colorant present in the inkjet ink formulation producing the drops pins to the surface 20 of the ITM 22. As used herein, the terms "pin" and "pinning" refer to the fixing of at least the colorant present in the ink onto the ITM surface 20. Pinning occurs as a result of, at least in part, Van de Waals interaction between the colorant and the ITM surface 20 generated. As described herein, such interaction is increased when the surface energy of the ink matches the surface energy of the ITM surface 20. More specifically, the surface energy of the ink causes the ink drop to localize on the ITM surface 20. After the water (and possibly other solvents) in the ink evaporate, the remaining components (e.g., colorant) are set where printed. In some instances, the evaporation is increased to an amount that is on par with that of water present in the inkjet ink as a result of the surface energy.

While several embodiments have been described in detail, it will be apparent to those skilled in the art that the disclosed embodiments may be modified. Therefore, the foregoing description is to be considered exemplary rather than limiting.

What is claimed is:

1. In combination, an inkjet ink and an intermediate transfer medium for inkjet printing, the inkjet ink forming ink drops having a contact angle (θ) of less than or equal to 50° on the intermediate transfer medium, the contact angle (θ) reducing or substantially eliminating coalescence of adjacent ink drops, a property of at least one of the inkjet ink or a surface of the intermediate transfer medium being controllable to obtain the contact angle (θ).

2. The combination as defined in claim 1 wherein the property includes a surface energy of the ink drop, a surface energy of the surface of the intermediate transfer medium, or combinations thereof.

3. The combination as defined in claim 1 wherein the inkjet ink comprises a colorant dispersed in an ink vehicle, the ink vehicle including:
   a hydantoin glycol present in the ink in an amount ranging from about 1 wt % to about 15 wt %, the hydantoin glycol having a hydroxyl value ranging from about 450 to about 550;
   a dipolar aprotic solvent present in the ink in an amount ranging from about 0.5 wt % to about 15 wt %;
   a hyperbranched glycol present in the ink in an amount ranging from about 0.5 wt % to about 10 wt %;
   a fluorosurfactant present in the ink in an amount ranging from about 0.01 wt % to about 2 wt %;
   an organic phosphate present in the ink in an amount ranging from about 0.2 wt % to about 2 wt %; and
   water.

4. The combination as defined in claim 3 wherein:
   the hydantoin glycol is selected from di-(2-hydroxyethyl)-5,5-dimethylhydantoin, hydantoin-5-acetic acid, Allantoin, L-Aspartic acid hydantoin, and combinations thereof;
   the organic solvent is a dipolar aprotic solvent selected from 2-pyrrolidone, N-methyl-2-pyrrolidone, diols, polyols, glyceryl triacetate, glycerine, and combinations thereof;
   the hyperbranched glycol is selected from ethyl glycol, diethylene glycol, ethylene glycol butyl ether, ethylene glycol-bis(20aminoethylether)-N,N,N',N'-tetraacetic acid, poly(ethylene glycol)-block-poly(propylene glycol)-block-poly(ethylene glycol), and combinations thereof; and the organic phosphate is selected from oleth-3 phosphate, PPG-S ceteth-10 phosphate, linoleamidopropyl PG-dimonium chloride phosphate, trideceth-5 phosphate, oleth-5 phosphate, and combinations thereof.

5. The combination as defined in claim 3 wherein the inkjet ink further comprises a biocide present in the ink in an amount ranging from about 0.05 wt % to about 1 wt %.

6. The combination as defined in claim 1 wherein the surface of the intermediate transfer medium includes a matrix having incorporated therein particles covalently bonded to at least one terminating group in an amount sufficient to obtain the contact angle ($\theta$).

7. The combination as defined in claim 6 wherein the at least one terminating group is selected from at least one carboxylic terminating group, at least one hydroxyl terminating group, at least one sulfonate group, and combinations thereof.

8. An inkjet printing system, comprising an inkjet fluid ejector fluidically coupled to a reservoir containing an inkjet ink, and the fluid elector to eject the inkjet ink onto an intermediate transfer medium during inkjet printing, wherein the inkjet printing system is to perform a method, comprising:
ejecting, via the inkjet fluid ejector, the inkjet ink onto the intermediate transfer medium; and
reducing or substantially eliminating coalescence between the adjacent ink drops when the ink drops are ejected onto the intermediate transfer medium, the reducing or substantially eliminating the coalescence being accomplished by:
determining a contact angle ($\theta$) of the ink drops on the intermediate transfer medium; and
controlling at least one of a property of the inkjet ink or a property of a surface of the intermediate transfer medium to obtain the contact angle ($\theta$).

9. The inkjet printing system as defined in claim 8 wherein the inkjet ink comprises:
an ink vehicle, including:
hydantoin glycol having a hydroxyl value ranging from about 450 to about 550;
an organic solvent;
a hyperbranched glycol;
a fluorosurfactant;
an organic phosphate; and
water; and
a colorant dispersed in the ink vehicle.

10. The inkjet printing system as defined in claim 8 wherein the contact angle ($\theta$) is less than or equal to 50°.

11. The inkjet printing system as defined in claim 8 wherein the controlling of the at least one of the property of the inkjet ink or the property of the surface of the intermediate transfer medium includes decreasing the surface energy of the inkjet ink, increasing the surface energy of the surface of the intermediate transfer medium, or combinations thereof.

12. The inkjet printing system as defined in claim 11 wherein the decreasing of the surface energy of the inkjet ink is accomplished by i) adjusting the amount of at least one of the hydantoin glycol, hyperbranched glycol, or the fluorosurfactant present in the ink, or ii) replacing at least one of the hydantoin glycol or the hyperbranched glycol with at least one other element.

13. The inkjet printing system as defined in claim 11 wherein the increasing of the surface energy of the surface of the intermediate transfer medium includes subjecting the surface to a plasma, thereby introducing hydroxyl groups to the surface in an amount sufficient to obtain the contact angle ($\theta$).

14. The inkjet printing system as defined in claim 8 wherein the controlling further includes increasing evaporation of water from the ink drops, thereby pinning the colorant to the surface of the intermediate transfer medium.

15. The inkjet printing system as defined in claim 8 wherein the determining of the contact angle ($\theta$) is accomplished by:
determining a volume of the ink drops;
calculating, via a processor operatively associated with the inkjet printing system, a shortest distance (AB) between a contact point (B) of a first ink drop and a deposition location (A) of a second ink drop where coalescence between the first and second ink drops is substantially eliminated;
calculating, via a processor operatively associated with the inkjet printing system, the contact angle ($\theta$) based on the shortest distance (AB) using the formula:

$$AB = R_d \tan\left(\frac{\theta}{2}\right),$$

wherein $R_d$ is the radius of an ink drop.

16. The inkjet printing system as defined in claim 15 wherein the calculating of the contact angle is accomplished by drawing a tangent line from the contact point (B) on the surface of the intermediate transfer medium through a surface point (G) located at a surface of the second ink drop, the angle formed between the tangent line and the surface of the intermediate transfer medium being the contact angle ($\theta$).

17. The inkjet printing system as defined in claim 15 wherein the shortest distance (AB) is overestimated, and wherein the method further comprises determining an overestimation error using the formula: Error=1−cos $\alpha$, where $$\cos\alpha = \frac{R_d + R\cos\theta}{R + R_d},$$

where $R_d$ is the radius of the second ink drop and R is the distance from the contact point (B) of the first ink drop to a point (O).

18. The inkjet printing system as defined in claim 8 wherein the determining of the contact angle ($\theta$) is accomplished by at least one of:
i) determining an extent of overlap between the first and second ink drops using the formula:

$$\text{overlap}(\%) = 1/2 - \left(\frac{2 - 3\cos\theta + \cos^3\theta}{4(1 + \cos\theta)^3}\right)^{1/3} = 1/2\left(1 - \frac{R_d \tan(\theta/2)}{\rho}\right),$$

or
ii) determining a radius ratio between the first and second ink drops using the formula:

$$R_d/\rho = \frac{\left(\frac{2 - 3\cos\theta + \cos^3\theta}{4\sin^3\theta}\right)^{1/3}}{\tan(\theta/2)},$$

$\rho$ is the radius of the first ink drop and $R_d$ is the radius of the second ink drop.

* * * * *

UNITED STATES PATENT AND TRADEMARK OFFICE
CERTIFICATE OF CORRECTION

| | | |
|---|---|---|
| PATENT NO. | : 8,714,731 B2 | |
| APPLICATION NO. | : 13/383756 | |
| DATED | : May 6, 2014 | |
| INVENTOR(S) | : Sui-hing Leung et al. | |

It is certified that error appears in the above-identified patent and that said Letters Patent is hereby corrected as shown below:

In the Claims

In column 14, line 64, in Claim 4, delete "bis(20aminoethylether)" and insert -- bis(2-aminoethylether) --, therefor.

In column 15, line 21, in Claim 8, delete "elector" and insert -- ejector --, therefor.

In column 15, line 44, in Claim 9, after "phosphate;" delete "and".

Signed and Sealed this
Fifth Day of August, 2014

Michelle K. Lee
*Deputy Director of the United States Patent and Trademark Office*